Feb. 26, 1924.　　　　　　　　　　　　　　　　　　　　　1,484,667
W. H. ODLUM
LOCKING DEVICE FOR STEERING GEARS
Filed Aug. 18, 1921　　　　　2 Sheets-Sheet 1

Inventor:
William H. Odlum
by Banning & Banning
Attys

Feb. 26, 1924.
W. H. ODLUM
1,484,667
LOCKING DEVICE FOR STEERING GEARS
Filed Aug. 18, 1921    2 Sheets-Sheet 2
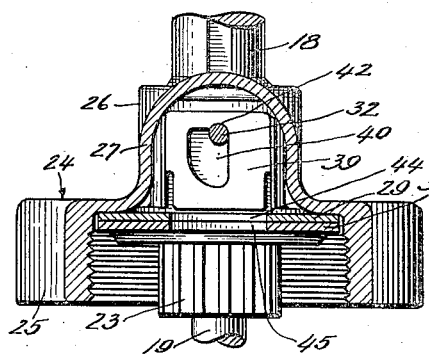
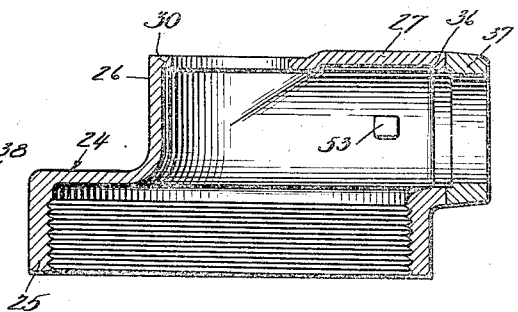
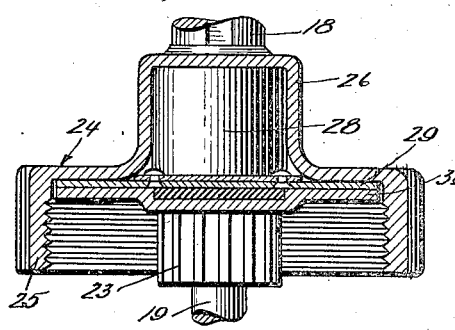
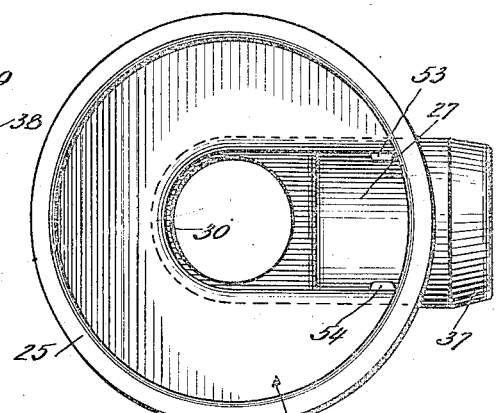
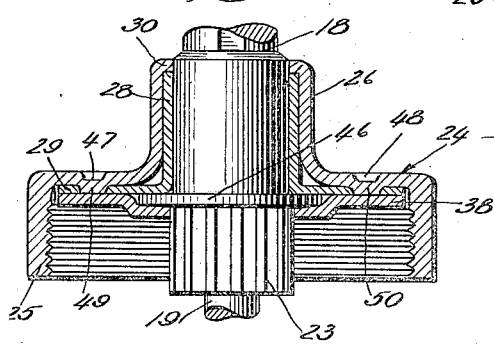
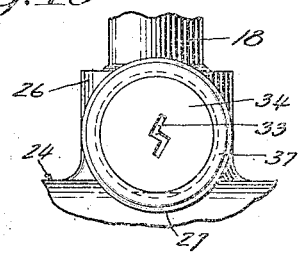
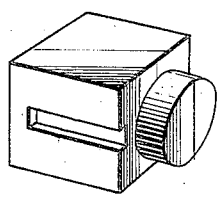
Inventor:
William H. Odlum Patented Feb. 26, 1924.

1,484,667

UNITED STATES PATENT OFFICE.

WILLIAM H. ODLUM, OF CHICAGO, ILLINOIS.

LOCKING DEVICE FOR STEERING GEARS.

Application filed August 18, 1921. Serial No. 493,225.

*To all whom it may concern:*

Be it known that I, WILLIAM H. ODLUM, a citizen of the United States, residing at Chicago, in the county of Cook and State of Illinois, have invented certain new and useful Improvements in Locking Devices for Steering Gears, of which the following is a specification.

This invention has to do with certain improvements in locking devices for the steering gears of automobiles and the like. It has reference particularly to improvements in locking devices for the steering gears of Ford cars, but it will presently appear that the invention is not limited to this particular use nor to any other. However, as a matter of convenience in illustration, I have shown the features of the present invention as being applied to a steering device of the form which is most frequently used on the above class of cars.

One of the objects of the invention is to provide a locking device which may be very easily and cheaply applied to the steering gear as the same is generally found on these cars, and without having to perform more than a very few simple changes in the steering gear itself.

Another object of the invention is to provide a locking device including a housing which may be easily and cheaply formed from pressed metal, such as pressed steel. In this connection, another object is to so shape and form the housing that it will very effectually protect the interior mechanism against unauthorized tampering. In this connection, another feature has to do with the provision of a construction such that all of the locking devices are contained within the housing into which they are introduced in such a manner that they can only be removed therefrom after first either removing the housing itself or else seriously mutilating or destroying it.

Another object of the invention is to so construct the housing and the interior mechanism that the locking devices themselves will operate in a ready and easy manner and without jamming.

Other objects and uses will appear from a detailed description of the same, which consists in the features of construction and combinations of parts hereinafter described and claimed.

In the drawings:

Fig. 5 shows a cross section taken on the line 5—5 of Fig. 3, looking in the direction of the arrows;

Fig. 6 shows a cross section taken on the line 6—6 of Fig. 3, looking in the direction of the arrows;

Fig. 7 shows a cross section taken on the line 7—7 of Fig. 3, looking in the direction of the arrows;

Fig. 8 shows a cross section corresponding to Fig. 1 with the exception that all of the operative devices have been removed from the interior of the shell;

Fig. 9 shows a bottom view corresponding to Fig. 8;

Fig. 10 shows a fragmentary view corresponding to a portion of Fig. 2, but showing a modified form of construction; and Fig. 11 shows a perspective view of a modified form of lock barrel of irregular shape.

Figures 1, 2:
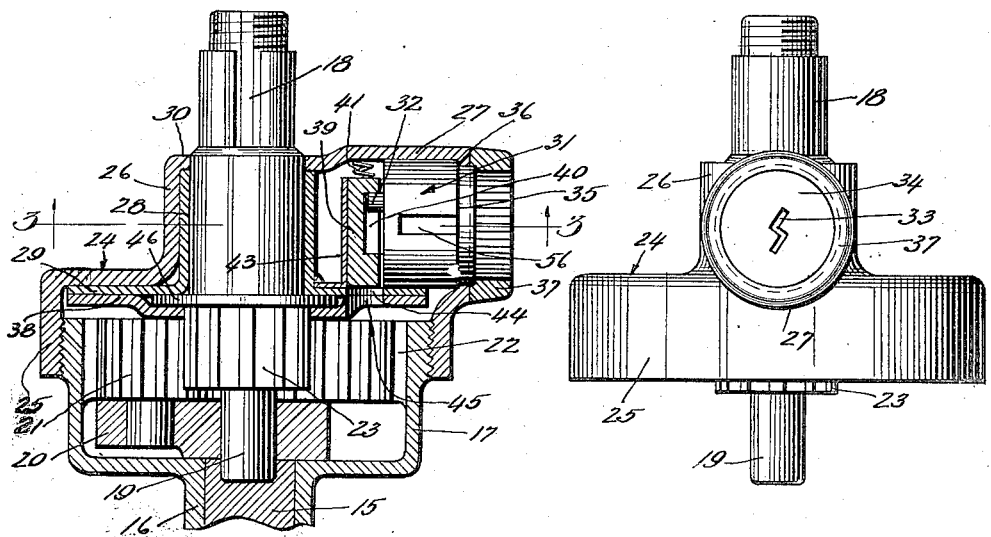
Figure 1 shows a vertical section through a locking device embodying the features of the present invention, being also a section taken on the line 1—1 of Fig. 3 looking in the direction of the arrows.
Fig. 2 shows an outside elevational view of a locking device embodying the present invention, being taken at right angles to the position of Fig. 1.

Referring first to the construction shown in Figs. 1 to 9 inclusive, the steering shaft which leads down to the steering wheels is designated by the numeral 15. It is rotatably mounted within the stationary post 16. The upper end of said post carries the enlarged circular box chamber 17 within which is located certain of the steering gears. The spindle 18 carries the steering wheel at its upper end, the lower end 19 of said spindle being journaled within the upper end of the shaft 15. A spider 20 is connected to the upper end of the shaft 15 and carries a series of pinions 21 which mesh with an internal gear 22 in the upper portion of the housing 17. The spindle 18 carries a pinion 23 which meshes simultaneously with all of the pinions 21. Upon rotating the spindle 18 by turning the steering wheel, the steering shaft 15 is rotated in the same direction, but at reduced speed owing to the interposition of the pinions and the internal gear.

The spindle 18 together with the pinion 23 and the pinions 21 are a portion of the standard equipment of a Ford car, and one of the objects of the present invention is to provide a locking device which may be used in direct conjunction with as much of its standard equipment as possible, and without the necessity of modifying it unnecessarily. I will now describe the construction which has been provided for making this possible.

I provide a pressed steel cap 24 for the upper end of the housing 17. Said pressed steel cap has a downwardly depending flange 25 which threads onto the upper outside portion of the housing 17. This cap is also formed with an upwardly extending neck 26 of reduced size in conjunction with a sidewise extending barrel chamber 27. The neck 26 is of somewhat greater size than the center portion of the stem 18, so as to receive an interposed bushing 28. This bushing has the outwardly flared flange portion 29 which seats squarely against the circular portion of the cap 24 as will be clearly evident from a comparison of the various figures, and thus establishes a flooring which more or less isolates the barrel chamber 27 from the gear portion which accommodates the various gears and pinions. By making the neck portion 26 of the cap of slightly larger size than the center portion of the stem 18, provision is made for the accommodation of the bushing 28 by means of which the flanged floor portion 29 is given added stability and strength.

In order to prevent unauthorized tampering with the bushing portion 28, the upper edge of the neck 26 may be inturned as shown at 30 in Fig. 1 in particular, so as to protect said upper edge either in whole or in part against unauthorized interference and tampering.

Within the barrel chamber 27 is located the locking barrel 31. This locking barrel may be of any convenient form and of any standard construction. I do not deem it necessary to describe the construction of the same in detail in this specification. I will state, however, that it is provided with internal tumblers and suitable locking mechanism by means of which the inwardly projecting pin 32 may be rotated through a half revolution by means of a key inserted through the key opening 33 in the rotatable portion 34 of the locking device. This will carry the pin 32 between the upper and lower extremities of movement. In Figs. 1 and 5 said pin is shown in its raised or uppermost position.

The locking barrel 31 is provided with an outwardly facing shoulder 35. The edge of the barrel chamber 27 is inturned as at 36 to provide a stop shoulder which engages the shoulder 35 and thereby prevents the barrel from being pulled out from the barrel chamber 27. The locking barrel may be inserted through the interior of the cap 24 before the insertion of the bushing 28 together with the flange 29.

In order to still further protect the locking barrel and to give the device a more finished appearance, a flange 37 may be forced into the projecting portion of the barrel as clearly shown in Fig. 1.

A locking plate 38 is seated down over the pinion 23, said plate 38 having a central perforation which is toothed to accommodate the teeth of the pinion 23, so that the plate 38 is compelled to rotate with said pinion. This plate 38 thus provides a flanged member which when locked will prevent the rotation of the pinion 23 and will thus lock the steering gear.

The locking of the plate 38 is accomplished by means of a vertically movable locking bolt 39, said locking bolt having a quadrant shaped slot 40 which receives the pin 32 from the locking barrel. A spring 41 normally presses the bolt 39 downwardly and thus tends to project it into locking position, but when the pin 32 is raised into the unlocking position by the rotation of the key, the bolt is raised into the position shown in Figs. 1 and 5. In order to sustain the bolt in this position, I prefer to form a notch 42 in the upper corner of the quadrant shaped slot into which notch the pin 32 will take, in order to sustain the bolt in the raised position.

Figures 3, 4:
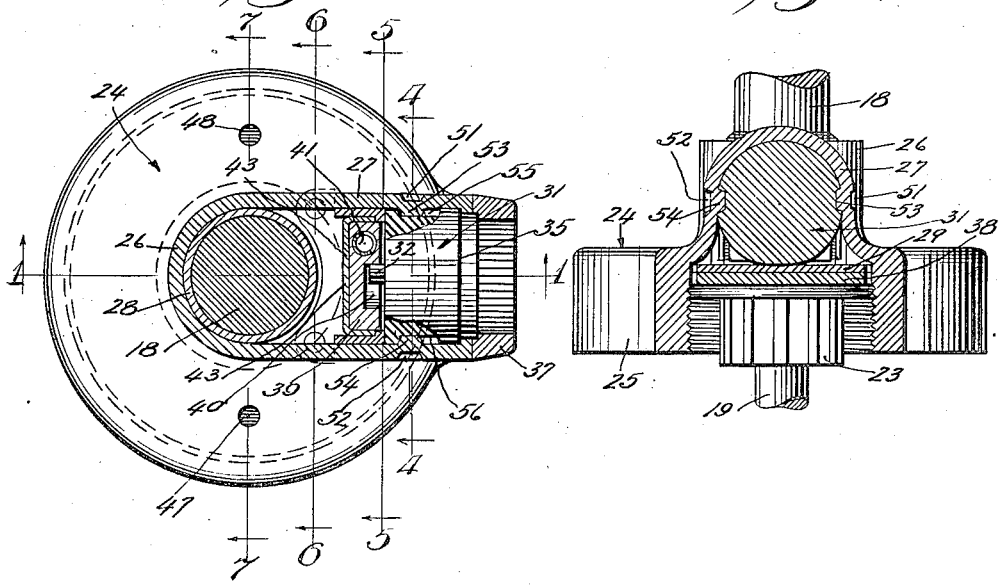
Fig. 3 shows a horizontal section taken on the line 3—3 of Fig. 1, looking in the direction of the arrows.
Fig. 4 shows a cross section taken on the line 4—4 of Fig. 3, looking in the direction of the arrows.

The bolt is guided in its vertical movements by means of a U-shaped guard 43, best shown in Figs. 1, 3 and 5. This guard may be attached to the upper face of the flange 29, as shown in Figs. 1 and 3.

The flange 29 is provided with a bolt hole 44 in proper position to pass the lower end of the locking bolt; and the locking plate 38 is provided with a bolt hole 45 which may be brought around into registry with the bolt hole 44. At such times the bolt will drop through both of the holes and lock the two plates together.

In the standard construction of the steering gear to which this locking device is shown as being applied, there is a flange 46 on the stem 18. This flange would ordinarily sustain the locking plate 38 at a distance away from the flange 29 equal to the thickness of the flange 46; and therefore when the bolt has been passed through both holes there would be exerted a twisting force on the bolt each time an effort was made to turn the steering gear while locked. In order to overcome this objection, I have offset the peripheral portion of the locking plate 38 as shown in Figs. 1 and 7 in particular, so that the flange portions 38 and 29 are brought into direct contact, at least in those portions adjacent to the bolt holes.

In order to lock the flange 29 against rotation, I have provided the two semi-perforations 47 and 48 as shown in Figs. 3 and 7, the metal of said semi-perforations providing inwardly projecting lugs 49 and 50, which engage perforations in the flange 29.

In order to prevent rotation of the locking barrel 31, I have shown the barrel chamber 27 as having in its sides the semi-perforations 51 and 52 which establish the inwardly projecting lugs 53 and 54, as shown in Figs. 3 and 4 in particular. These lugs go into the longitudinally extending slots 55 and 56 of the locking barrel as said barrel is set into place.

It will be observed that the slots 55 and 56 do not extend inwardly the full length of the locking barrel, but they have their inner ends closed as clearly shown in Figs. 1 and 3. This will effectually prevent the withdrawal of the locking barrel from its chamber, thus providing a safe guard in addition to the presence of the flange 36 which is turned down against the collar 35 of the locking barrel.

Manifestly, another means may be provided for retaining the locking barrel against rotation. For example, as shown in Fig. 10, the barrel chamber may be provided in its extreme end with an irregular shaped hole which engages with the irregular outside periphery of the locking barrel, or as shown in Fig. 11, use may be made of an irregularly shaped barrel itself, which will engage with a barrel chamber of proper shape.

While I have herein shown and described a spring pressed locking device 39, I wish to state that this particular feature of the construction does not constitute a portion of the present invention, but is only herein shown by way of illustration. This is also true of the U-shaped bolt cap plate 43, and is also true of the flange plate 29 constituting a floor separating the barrel chamber more or less from the gear chamber.

I claim:

1. A locking device for a steering gear which includes an upwardly facing circular box like structure for gears of the steering mechanism and which includes a vertical spindle having on its lower end a pinion meshing with said gears and a peripheral flange immediately above said pinion, said locking device including an integral pressed metal cap of proper size and contour to engage and close the upper portion of said box like structure, said cap having an integral upwardly extending central collar of size larger than the spindle aforesaid and in position to accommodate said spindle and having a horizontally extending locking cylinder chamber in communication with said collar, a locking cylinder non-rotatably seated within the locking cylinder chamber, an integral inturned shoulder on the end of the locking cylinder chamber and engaging the end portion of the locking cylinder to prevent endwise removal thereof, a bushing interposed between the aforesaid collar and the spindle, an integral inturned shoulder on the upper end of the collar overlying and protecting said bushing, a partition separating the locking cylinder chamber from the lower portion of the cap, a locking plate having a central toothed perforation adapted to seat over and engage the teeth of the spindle pinion, there being a bolt hole in the partition aforesaid for the accommodation of a vertically movable locking bolt, there being a bolt hole in the locking plate adapted to register with the bolt hole of the partition when the locking plate is turned into the proper position, a vertically movable locking bolt above the partition and adapted to work through the bolt holes aforesaid, and an operative connection from the cylinder chamber to said bolt, substantially as described.

2. A locking device for a steering gear which includes an upwardly facing circular box like structure for gears of the steering mechanism and which includes a vertical spindle having on its lower end a pinion meshing with said gears and a peripheral flange immediately above said pinion, said locking device including a metal cap of proper size and contour to engage and close the upper portion of said box like structure, said cap having an upwardly extending central collar in position to accommodate said spindle and having a horizontally extending locking cylinder chamber in communication with said collar, a locking cylinder non-rotatably seated within the locking cylinder chamber, an inturned shoulder on the end of the locking cylinder chamber and engaging the end portion of the locking cylinder to prevent endwise removal thereof, a partition separating the locking cylinder chamber from the lower portion of the cap, a locking plate having a central toothed perforation adapted to seat over and engage the teeth of the spindle pinion, there being a bolt hole in the partition aforesaid for the accommodation of a vertically movable locking bolt, there being a bolt hole in the locking plate adapted to register with the bolt hole of the partition when the locking plate is turned into the proper position, a vertically movable locking bolt above the partition and adapted to work through the bolt holes aforesaid, and an operative connection from the cylinder chamber to said bolt, substantially as described.

3. A locking device for a steering gear which includes an upwardly facing circular box like structure for gears of the steering mechanism and which includes a vertical spindle having on its lower end a pinion meshing with said gears, said locking device including a metal cap of proper size and contour to engage and close the upper portion of said box like structure, said cap having an upwardly extending central collar in position to accommodate said spindle and having a horizontally extending locking cylinder chamber in communication with said collar, a locking cylinder non-rotatably seated within the locking cylinder chamber, a partition separating the locking cylinder chamber from the lower portion of the cap, a locking plate having a central toothed perforation adapted to seat over and engage the teeth of the spindle pinion, there being a bolt hole in the partition aforesaid for the accommodation of a vertically movable locking bolt, there being a bolt hole in the locking plate adapted to register with the bolt hole of the partition when the locking plate is turned into the proper position, a vertically movable locking bolt above the partition and adapted to work through the holes aforesaid, and an operative connection from the cylinder chamber to said bolt, substantially as described.

4. A locking device for a steering gear which includes an upwardly facing circular box like structure, and which includes a vertical spindle having on its lower end a pinion constituting a portion of the steering mechanism, said locking device including a metal cap of proper size and contour to engage and close the upper portion of said box like structure, said cap having an upwardly extending central collar in position to accommodate said spindle and having a horizontally extending locking cylinder chamber in communication with said collar, a locking cylinder non-rotatably seated within the locking cylinder chamber, a partition separating the locking cylinder chamber from the lower portion of the cap, a locking plate having a central perforation accommodating the spindle pinion and non-rotatable with respect to the spindle pinion, there being a bolt hole in the partition aforesaid for the accommodation of a vertically movable locking bolt, there being a bolt hole in the locking plate adapted to register with the bolt hole of the partition when the locking plate is turned into the proper position, a vertically movable locking bolt above the partition and adapted to work through the bolt holes aforesaid, and an operative connection from the cylinder chamber to said bolt, substantially as described.

5. In a locking structure for steering wheels, a cap for the box like structure of a locking device of the steering gear, said cap having an integral upwardly extending central collar for the accommodation of a vertical steering spindle, and having a horizontally extending locking cylinder chamber in communication with said collar, a locking cylinder non-rotatably seated within the locking cylinder chamber, an integral inturned shoulder on the end of the locking cylinder chamber and engaging the end portion of the locking cylinder to prevent endwise removal thereof, a bushing seated within the collar aforesaid, an integral inturned shoulder on the upper end of the collar overlying and protecting said bushing, a partition separating the locking cylinder chamber from the lower portion of the cap, a locking plate immediately beneath said partition, there being a bolt hole in the partition aforesaid for the accommodation of a vertically movable locking bolt, there being a bolt hole in the locking plate adapted to register with the bolt hole of the partition when the locking plate is turned into the proper position, a vertically movable locking bolt above the partition and adapted to work through the bolt holes aforesaid, and an operative connection from the cylinder chamber to said bolt, substantially as described.

6. In a locking structure for steering wheels, a cap for the box like structure of a locking device of the steering gear, said cap having an integral upwardly extending central collar for the accommodation of a vertical steering spindle, and having a horizontally extending locking cylinder chamber in communication with said collar, a locking cylinder non-rotatably seated within the locking cylinder chamber, means preventing the removal of the locking cylinder endwise from the locking cylinder chamber, a bushing seated within the collar aforesaid, a partition separating the locking cylinder chamber from the lower portion of the cap, a locking plate immediately beneath said partition, there being a bolt hole in the partition aforesaid for the accommodation of a vertically removable locking bolt, there being a bolt hole in the locking plate adapted to register with the bolt hole of the partition when the locking plate is turned into the proper position, a vertically movable locking bolt above the partition and adapted to work through the bolt holes aforesaid, and an operative connection from the cylinder chamber to said bolt, substantially as described.

WILLIAM H. ODLUM.